(12) United States Patent
Notzke et al.

(10) Patent No.: US 10,010,832 B2
(45) Date of Patent: Jul. 3, 2018

(54) MEMBRANE MODULE

(71) Applicant: Helmholtz-Zentrum Geesthacht Zentrum Fuer Material—und Kuestenforschung GmbH, Geesthacht (DE)

(72) Inventors: Heiko Notzke, Glinde (DE); Torsten Brinkmann, Geesthacht (DE); Thorsten Wolff, Geesthacht (DE); Li Zhao, Juelich (DE); Sebastian Luhr, Hueckelhoven (DE)

(73) Assignee: Helmholtz-Zentrum Geesthacht Zentrum Fuer Material—und Kuestenforschung GmbH, Geesthacht (DE)

( * ) Notice: Subject to any disclaimer, the term of this patent is extended or adjusted under 35 U.S.C. 154(b) by 0 days.

(21) Appl. No.: 15/560,340

(22) PCT Filed: Mar. 4, 2016

(86) PCT No.: PCT/EP2016/054636
§ 371 (c)(1),
(2) Date: Sep. 21, 2017

(87) PCT Pub. No.: WO2016/150679
PCT Pub. Date: Sep. 29, 2016

(65) Prior Publication Data
US 2018/0111094 A1    Apr. 26, 2018

(30) Foreign Application Priority Data
Mar. 25, 2015 (EP) .................................... 15160724

(51) Int. Cl.
*B01D 53/22* (2006.01)
*B01D 63/08* (2006.01)

(52) U.S. Cl.
CPC ........... *B01D 63/084* (2013.01); *B01D 53/22* (2013.01); *B01D 2313/08* (2013.01); *B01D 2313/20* (2013.01)

(58) Field of Classification Search
CPC ............ B01D 2313/20; B01D 2313/08; B01D 63/084; B01D 53/22; B01D 63/00; B01D 63/14
See application file for complete search history.

(56) References Cited

U.S. PATENT DOCUMENTS 5,486,475 A * 1/1996 Kramer .................. B01D 53/22
                                                                  435/266
5,891,222 A * 4/1999 Hilgendorff ......... B01D 63/084
                                                                  210/321.75
(Continued)

FOREIGN PATENT DOCUMENTS

DE           3507532 A1    9/1986
DE     102011079647 A1    1/2013
(Continued)

OTHER PUBLICATIONS

International Search Report dated Jun. 22, 2016 in corresponding PCT application No. PCT/EP2016/054636.
(Continued)

*Primary Examiner* — Anthony Shumate
(74) *Attorney, Agent, or Firm* — Nields, Lemack & Frame, LLC

(57) ABSTRACT

The present invention relates to a novel membrane module for separating a fluid feed stream into a permeate stream and a retentate stream. The membrane module according to the invention is characterized in that all components are housed in a 20', 40', 45' HC, 45' PW or 53' HC container, whereby the membrane module can be transported and handled in a very simple and cost-effective manner despite its comparatively large volume and its high weight. The membrane
(Continued)

module is furthermore characterized by its large membrane surface area compared with usually used membrane modules, whereby the number of individual membrane modules required in practical use can be reduced many times over. The present invention furthermore relates to a process for separating a fluid feed stream into a permeate stream and a retentate stream using the membrane module according to the invention.

17 Claims, 6 Drawing Sheets

(56) References Cited

U.S. PATENT DOCUMENTS

| | | | | |
|---|---|---|---|---|
| 5,891,328 A * | 4/1999 | Goldstein | B01D 53/228 204/627 |
| 6,126,819 A * | 10/2000 | Heine | B01D 63/024 210/139 |
| 6,258,270 B1 * | 7/2001 | Hilgendorff | B01D 63/084 210/321.75 |
| 6,332,913 B1 * | 12/2001 | Breitschwerdt | B01D 53/22 95/55 |
| 2006/0086654 A1 * | 4/2006 | Voigt | B01D 63/081 210/321.6 |
| 2011/0000840 A1 * | 1/2011 | Kiene | B01D 63/082 210/249 |
| 2011/0127206 A1 * | 6/2011 | Meyer-Blumenroth | B01D 63/043 210/232 |
| 2014/0291242 A1 * | 10/2014 | Notzke | B01D 61/362 210/640 |
| 2015/0060360 A1 * | 3/2015 | Motherway | B01D 63/103 210/639 |
| 2015/0209700 A1 * | 7/2015 | Voigt | B01D 61/18 210/489 |
| 2015/0343385 A1 * | 12/2015 | Marschke | B01D 63/082 210/321.84 |

FOREIGN PATENT DOCUMENTS

| | | |
|---|---|---|
| EP | 0610715 A1 | 8/1994 |
| FR | 2745506 A1 | 9/1997 |
| WO | 2010/084962 A1 | 7/2010 |

OTHER PUBLICATIONS

International Preliminary Report on Patentability dated Jul. 7, 2017 in corresponding PCT application No. PCT/EP2016/054636.
"Pall Aria Mobile PAM C40 Water Treatment Systems," Pall Corporation, Feb. 2012.

* cited by examiner

MEMBRANE MODULE

The present invention relates to a membrane module for separating a fluid feed stream into a permeate stream and a retentate stream.

BACKGROUND OF THE INVENTION

The combustion of fossil fuels to generate energy has resulted in a large increase in the proportion of carbon dioxide in the Earth's atmosphere in recent decades, wherein the concentration of carbon dioxide in the Earth's atmosphere has increased by almost 40% since the start of industrialization. Furthermore it is believed that the emission of carbon dioxide accounts for approximately 60% of the greenhouse effect caused by humans. In order to counteract further global warming, it is therefore imperative that the emission of carbon dioxide into the Earth's atmosphere be reduced as much as possible. As a large part of global carbon dioxide emissions are caused by the combustion of fossil fuels in coal-fired power stations, a huge savings potential for reducing global carbon dioxide emissions is to be found here.

Various processes for reducing the carbon dioxide emitted are already used in large-scale process engineering. So-called membrane separation processes in which the substance mixture to be separated, e.g. the flue gas of a power station, is separated into a retentate stream and a permeate stream by means of a membrane appear to be particularly advantageous. The stream which penetrates the membrane and is thus separated from the feed material is called the permeate stream. The stream stripped of the permeate, which does not penetrate the membrane and leaves the separation unit, is called the retentate stream. Using renewable energy, the carbon dioxide separated off as permeate can then be converted into usable, carbon-based products such as fuels or polymers, or can be stored underground or used as nutrient for algae.

In order to provide the membrane surface area necessary for removing carbon dioxide from the flue gas of a power station, relatively small membrane modules are currently used in large numbers. For example, approximately 6,000 standard membrane modules, each with an effective membrane surface area of 100 m², are necessary to remove the carbon dioxide from the flue gas of a hard-coal-fired power station with a capacity of 1500 MW. However, the individual membrane modules must be equipped with the corresponding control valves and tubing, which makes the process very error-prone, maintenance-intensive and expensive. It would therefore be desirable to use a small number of comparatively large membrane modules. However, it is currently very laborious and expensive to handle and, above all, transport large membrane modules, because of the comparatively large volume and high weight. Comparatively large membrane modules have therefore not come into use yet.

DESCRIPTION OF THE INVENTION

The object of the present invention is to provide a membrane module with which the above disadvantages can be overcome. In particular, a membrane module is to be provided which has a comparatively large membrane surface area and at the same time can be transported and handled in a simple and cost-effective manner. Furthermore, a process for separating a fluid feed stream into a permeate stream and a retentate stream using the membrane module according to the invention is to be provided.

The above objects are achieved by a membrane module according to claim 1 and by a process according to claim 8.

Accordingly, a membrane module for separating a fluid feed stream which comprises permeate material and retentate material into a permeate stream and a retentate stream with the following features is provided. The membrane module according to the invention comprises a substantially box-shaped 20', 40', 45' HC, 45' PW or 53' HC container, with an internal space which is defined by a floor, two to four side walls and a roof, and has a width, height and length.

Furthermore, the membrane module comprises one or more fluid inlet openings (feed stream inlet openings) in at least one side wall of the container as well as one or more retentate outlet openings, for discharging the retentate stream, in at least one other side wall of the container. The fluid inlet openings and retentate outlet openings are in flow connection with each other.

In addition, the membrane module comprises one or more permeate outlet openings in at least one floor, side wall or roof of the container, which serve to discharge the permeate stream from the container, as well as one or more membrane pocket stacks arranged inside the container. The membrane pocket stacks comprise membrane pockets arranged in the form of a stack and, adjacent to the one or more fluid inlet openings and/or the one or more retentate outlet openings, first spacers between the membrane pockets. The first spacers serve to keep the membrane pockets spaced apart, in order to make a free flow cross-section for the throughflow of the fluid feed stream and/or the retentate stream possible. The membrane pockets each comprise two membranes, which are each present on one carrier material, as well as one or more second spacers present between the membranes. The second spacers keep the membranes spaced apart and thus make a free flow cross-section for the throughflow of the permeate stream through the membrane pockets possible. The membranes of a membrane pocket are furthermore connected to each other at the edges in order to prevent the fluid feed stream and/or the retentate stream from penetrating into the membrane pockets.

Moreover, the membrane module according to the invention comprises one or more permeate tubes. The one or more permeate tubes lead, perpendicularly to the flow direction of the fluid feed stream, to the one or more permeate outlet openings. The permeate tubes furthermore comprise one or more radial openings, through which the permeate material from the membrane pockets arrives in the one or more permeate tubes. In addition, first seals, which prevent the fluid feed stream and/or the retentate stream from coming into contact with the one or more permeate tubes, are fitted on the one or more permeate tubes between the membrane pockets.

The one or more membrane pocket stacks extend substantially along the entire length and width, preferably along the entire length, width and height, of the internal space of the container.

It is preferred that the part of the internal space of the 20', 40', 45' HC, 45' PW or 53' HC container which is not filled with the one or more permeate tubes is almost completely, preferably completely, filled with one or more membrane pocket stacks. In particular, the one or more membrane pocket stacks are arranged such that they completely fill a flow cross-section of the container transverse to the flow direction of the fluid feed stream, wherein the flow cross-section is delimited transverse to the flow direction by the side walls as well as the roof and floor of the container. The side walls as well as the roof and floor of the container thus delimit the fluid feed stream in its path from the one or more fluid inlet openings to the one or more retentate outlet openings. The membranes or the membrane pockets of the one or more membrane pocket stacks preferably run substantially parallel to the floor and the roof of the container. A corresponding arrangement of the membrane pocket stacks results in a very large membrane surface area per membrane module.

DETAILED DESCRIPTION OF THE INVENTION

The present invention is described in detail in the following with reference to the figures. The figures only show preferred embodiments and in no way limit the invention.

Container

Figure 1:
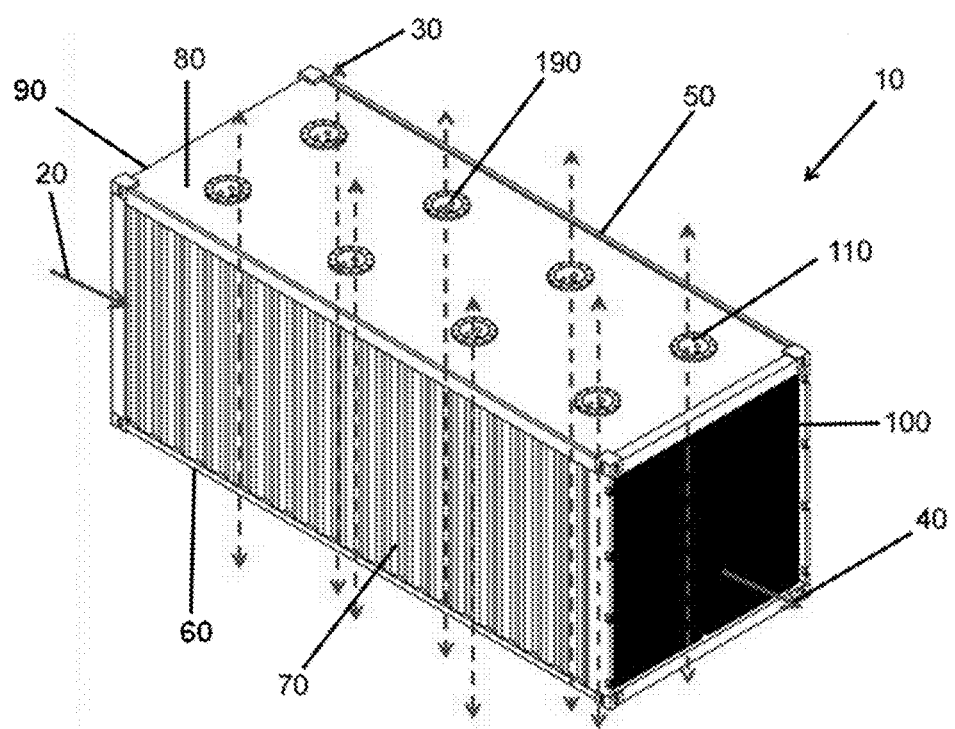
FIG. 1 shows a top view of an embodiment of the membrane module according to the invention.

The membrane module 10 comprises a 20', 40', 45' HC, 45' PW or 53' HC container 50. The container 50 comprises a floor 60, two to four side walls 70 as well as a roof 80 and is substantially box-shaped. The floor 60, the side walls 70 as well as the roof 80 enclose an internal space 85 of the container 50. The container 50 is preferably a 20' or 40' container, particularly preferably a 20' container.

The use of a 20', 40', 45' HC, 45' PW or 53' HC container 50 has the advantage that it can be transported and handled by means of frequently used and globally standardized devices. There is thus no need to design, build and install new devices for transporting and handling the membrane module 10, which results in a substantial cost reduction.

Fluid Inlet Openings/Retentate Outlet Openings

The container 50 has one or more fluid inlet openings 90 in a side wall 70 for introducing the fluid feed stream 20 into the membrane module 10.

If the membrane module 10 is used to remove carbon dioxide from the flue gas of a power station, the flue gas represents the fluid feed stream 20. The flue gas is then guided, by means of tubes, through the one or more fluid inlet openings 90 into the membrane module 10. However, other uses of the membrane module 10 are also conceivable; the use of the membrane module 10 is in no way limited to the removal of carbon dioxide from the flue gas of a power station.

Furthermore, in another side wall 70 the container 50 has one or more retentate outlet openings 100 for discharging the retentate stream 40 from the membrane module 10.

The fluid inlet openings 90 and retentate outlet openings 100 are in flow connection with each other.

Figure 2:
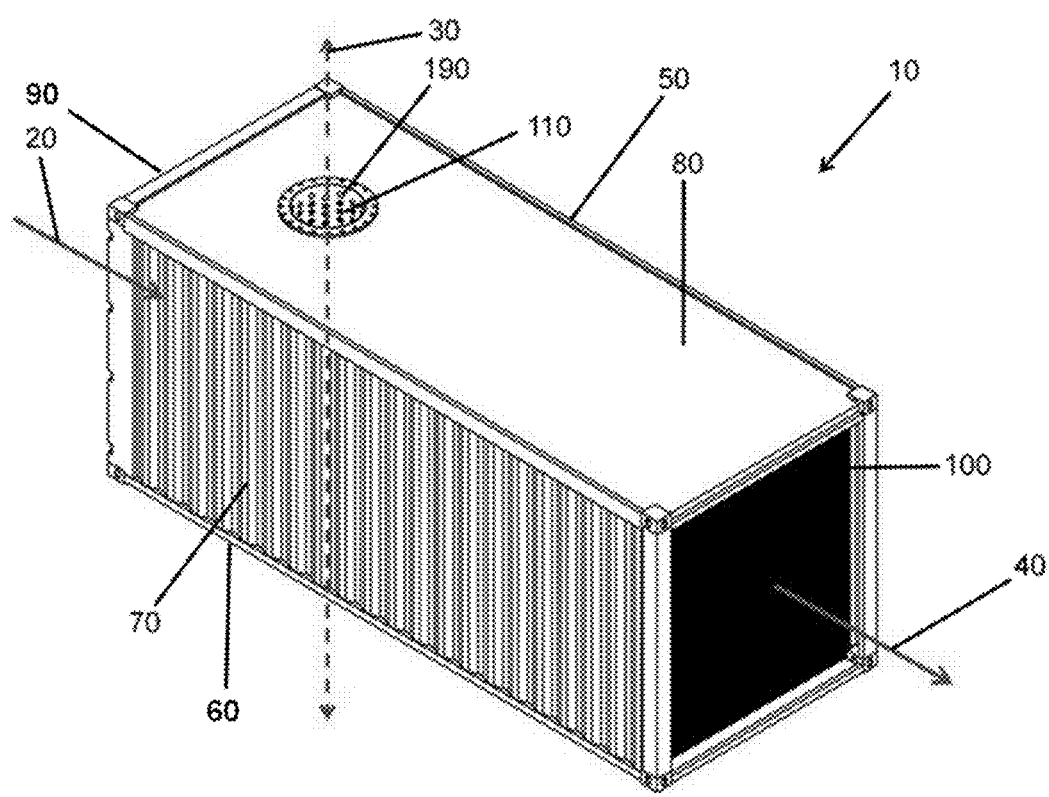
FIG. 2 shows a top view of a further embodiment of the membrane module according to the invention.

According to a preferred embodiment shown in FIG. 1 and FIG. 2, one side wall 70 of the container 50 is formed entirely as retentate outlet opening 100. Another side wall 70 is preferably formed entirely as fluid inlet opening 90. According to another embodiment, one side wall 70 is formed entirely as fluid inlet opening 90 and another side wall 70 comprises one or more retentate outlet openings 100. According to a further embodiment, one side wall 70 is formed entirely as retentate outlet opening 100 and another side wall 70 comprises one or more fluid inlet openings 90.

If a side wall 70 is formed entirely as fluid inlet opening 90 or retentate outlet opening 100, the side wall 70 is thus entirely replaced by the fluid inlet opening 90 or retentate outlet opening 100. A container 50 which has a side wall 70 formed entirely as fluid inlet opening 90 as well as a side wall 70 formed entirely as retentate outlet opening 100 therefore comprises a floor 60, two side walls 70 as well as a roof 80.

According to a preferred embodiment, the one or more fluid inlet openings 90 and the one or more retentate outlet openings 100 are fitted in opposite side walls 70 of the container. According to a particularly preferred embodiment, one side wall 70 is formed entirely as fluid inlet opening 90 and the opposite side wall 70 is formed entirely as retentate outlet opening 100. According to another embodiment, one side wall 70 comprises 1 to 100, more preferably 1 to 10, fluid inlet openings 90 and another side wall 70, preferably opposite the first side wall, likewise comprises 1 to 100, more preferably 1 to 10, retentate outlet openings 100.

Permeate Outlet Openings

Furthermore, in at least one floor 60, side wall 70 or roof 80 of the container 50 the membrane module 10 has one or more permeate outlet openings 110 for discharging the permeate stream 30. These are connected to permeate tubes 180 inside the container 50.

If the membrane module 10 is used for removing carbon dioxide from the flue gas of a power station, the carbon dioxide removed from the flue gas represents the permeate stream 30. For further purification, the permeate stream of one membrane module 10 can be introduced, as fluid feed stream 20, into a further, series-connected membrane module 10.

According to a preferred embodiment, both the floor 60 and the roof 80 of the container 50 comprise the same number of one or more permeate outlet openings 110.

The permeate outlet openings 110 are preferably arranged opposite each other in the floor 60 and roof 80.

According to an embodiment shown in FIG. 1, the membrane module 10 comprises in each case eight permeate outlet openings 110 in the roof 80 and floor 60 of the container 50. According to the embodiment shown in FIG. 2, the membrane module 10 comprises in each case one permeate outlet opening 110 in the roof 80 as well as in the floor 60 of the container 50.

According to a preferred embodiment, the permeate outlet openings 110 are formed as a flange 210.

According to a particularly preferred embodiment, the membrane module 10 comprises 1 to 100, more preferably 1 to 10, still more preferably 1 to 8, permeate outlet openings 110.

Membrane Pocket Stack

In addition, the membrane module 10 has one or more membrane pocket stacks 120 inside the container 50, for separating the fluid feed stream 20 into a permeate stream 30 and a retentate stream 40.

Figure 6:
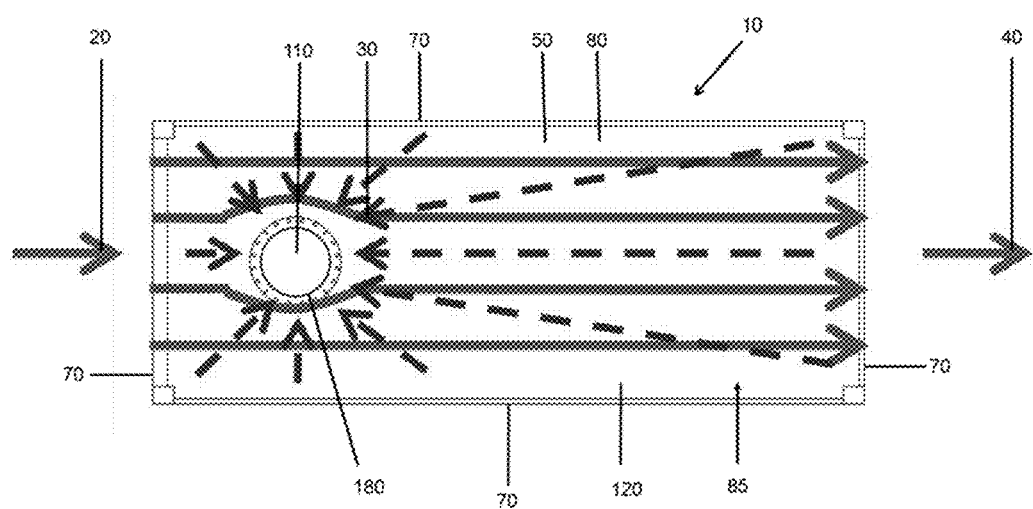
FIG. 6 shows a top view of a section through the membrane module according to the invention, in which a membrane pocket stack extends substantially over the entire length and width of the internal space of the container, as well as the flow directions of the fluid feed stream/retentate stream and of the permeate stream according to an embodiment of the membrane module according to the invention.

As can be seen in FIG. 6, a membrane pocket stack 120 extends substantially over the entire dimensions of the internal space (length and width, preferably length, width and height) of the container 50. Only the area in which the permeate tube 180 runs is left open by the membrane pocket stacks 120. Optionally, it is also possible to arrange several membrane pocket stacks 120 one above another, with the result that together they fill the internal space 85 of the container 50. Each individual membrane pocket stack 120 extends substantially over the entire width and length of the internal space 85.

Figure 7:
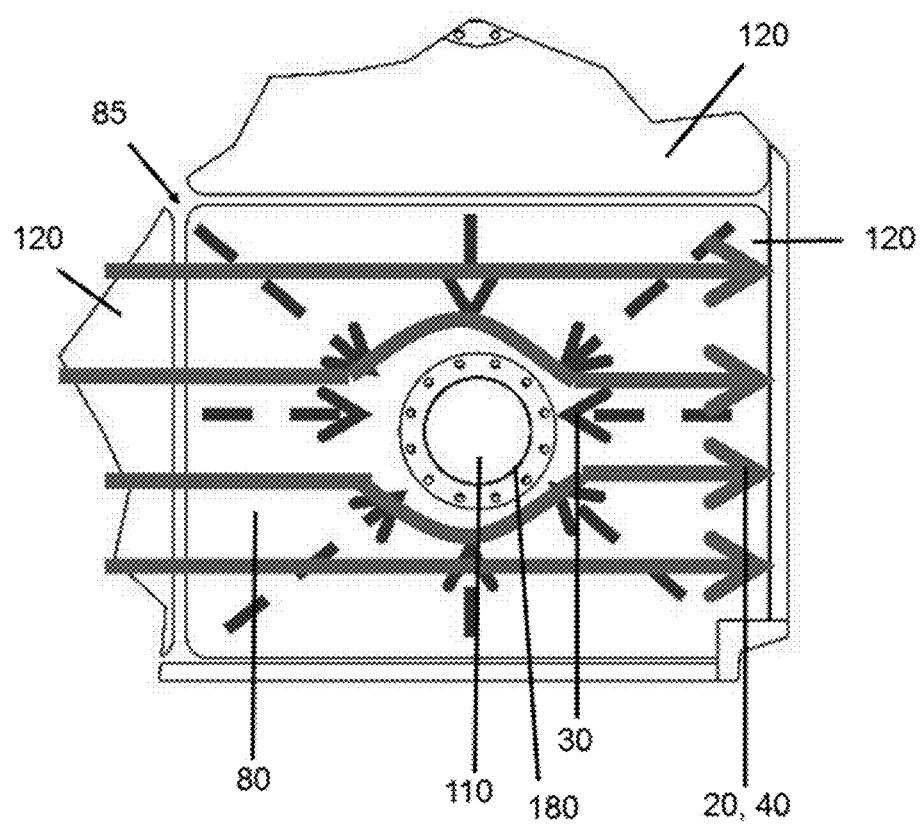
FIG. 7 shows a cut-out of a top view of a section through the membrane module according to the invention, in which several membrane pocket stacks extend substantially over the entire length and width of the internal space of the container, as well as the flow directions of the fluid feed stream/retentate stream and of the permeate stream on a permeate tube.

FIG. 7 shows a further embodiment of the invention, according to which several membrane pocket stacks 120 are arranged next to each other and together substantially fill the entire internal space 85 of the container 50. Optionally, the membrane pocket stacks 120 can be arranged not only next to each other but additionally also one above another and thus fill the entire internal space 85.

It is understood that the internal space 85 of the container 50 filled by the membrane pocket stacks 120 does not include the area or areas in which the permeate tube or tubes 180 extend.

If the membrane module 10 is used for removing carbon dioxide from the flue gas of a power station, the carbon dioxide separated off from the flue gas represents the permeate stream 30. However, it is also conceivable that other compounds or substances are separated off from a fluid feed stream 20, wherein these compounds or substances that have been separated off then represent the permeate stream 30.

The membrane pocket stacks 120 comprise membrane pockets 130 arranged in the form of a stack, which each comprise two membranes 150. The membranes 150 are preferably each secured to one carrier material 160.

First spacers 140 which keep the membrane pockets 130 spaced apart from each other are preferably fitted between the membrane pockets 130, in order to make a free flow cross-section for the throughflow of the fluid feed stream 20 and/or of the retentate stream 40 between the membrane pockets 130 possible. The first spacers 140 are particularly preferably fitted adjacent to the one or more fluid inlet openings 90 and/or the one or more retentate outlet openings 100.

The membrane pockets 130 comprise, on their insides, one or more second spacers 170 between the membranes 150, in order to keep the membranes 150 spaced apart from each other, in order to make a free flow cross-section for the throughflow of the permeate stream 30 through the membrane pockets 130 possible.

The first and/or second spacers 140, 170, independently of each other, can comprise or entirely consist of a plastic fabric. However, other materials which can be selected by a person skilled in the art with reference to his general specialist knowledge are also conceivable.

Figure 5:
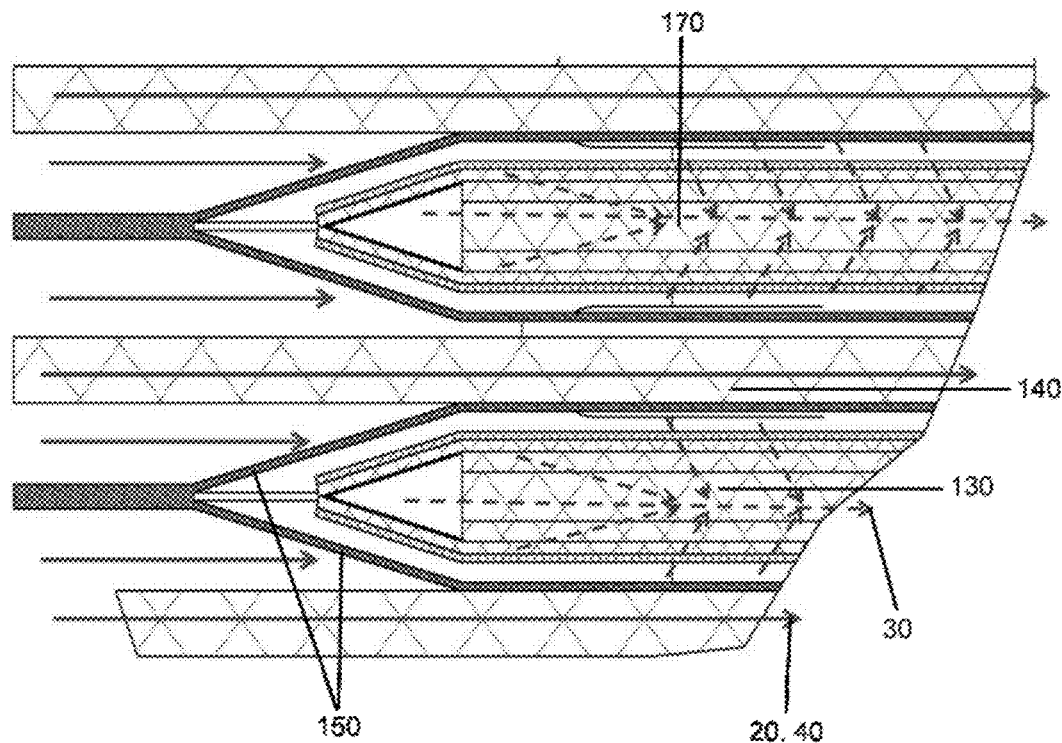
FIG. 5 shows an embodiment of the membrane pockets.

As shown in FIG. 5, the membranes 150 of a membrane pocket 130 are connected to each other at the edges, in order to prevent the fluid feed stream 20 and/or the retentate stream 40 from penetrating into the membrane pockets 130. According to a preferred embodiment, the membranes 150 are connected to each other by being thermally bonded to each other. However, other methods of connecting the membranes 150, such as for example gluing, are also conceivable.

Permeate Tubes

In addition, the membrane module 10 comprises one or more permeate tubes 180, which lead to the one or more permeate outlet openings 110 in the floor 60 and/or roof 80 of the container 50, in order to guide the permeate stream 30 from the membrane pockets 130 to the one or more permeate outlet openings 110, where the permeate stream 30 can then be discharged.

According to a preferred embodiment, the one or more permeate tubes 180 are arranged perpendicular to the flow direction of the fluid feed stream 20 in the container 50 in the one or more membrane pocket stacks 120.

Figure 4:
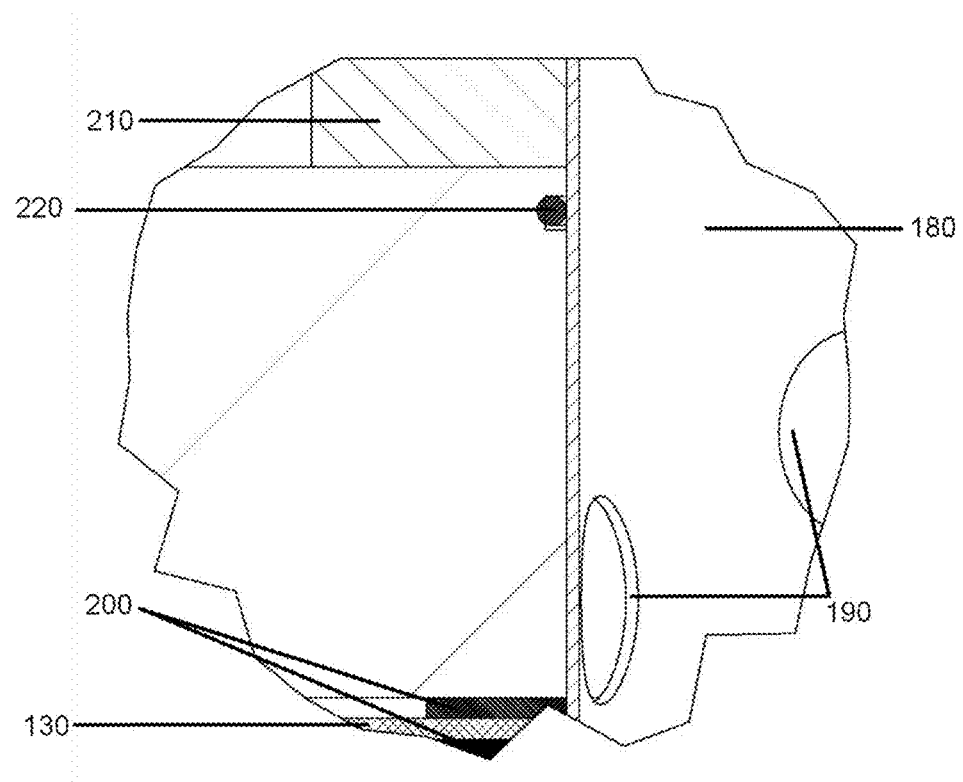
FIG. 4 shows an embodiment of the openings in a permeate tube.

As shown in FIG. 4, the one or more permeate tubes 180 comprise openings 190, through which the permeate stream 30 can flow out of the membrane pockets 130 into the one or more permeate tubes 180. According to a preferred embodiment, the one or more openings 190 are arranged radially in the one or more permeate tubes 180.

Furthermore, first seals 200 are fitted on the one or more tubes 180 between the membrane pockets 130, with the result that contact between the fluid feed stream 20 and/or the retentate stream 40 and the one or more permeate tubes 180 is prevented. Both the fluid feed stream 20 and the retentate stream 40, which are both present between the membrane pockets 130, are thus prevented from penetrating into the one or more permeate tubes 180.

Figure 3:
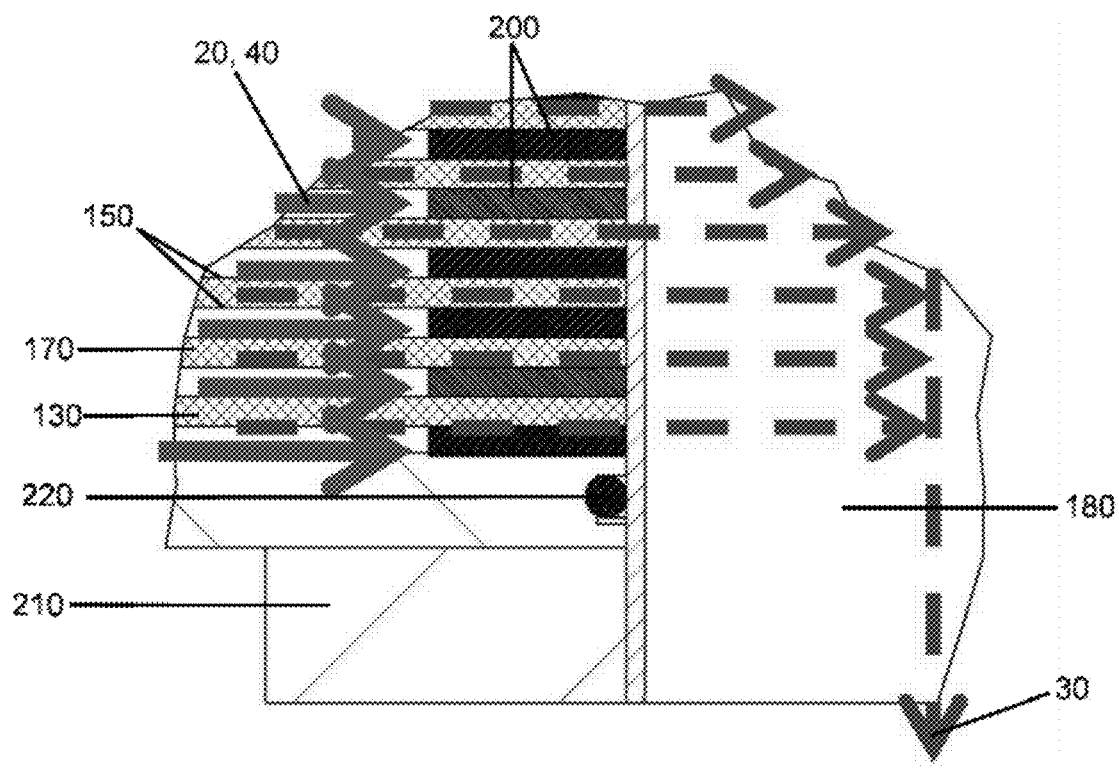
FIG. 3 shows an embodiment of the seals arranged on the permeate tubes and between the membrane pockets.

The one or more permeate tubes 180 are preferably sealed towards the outside with second seals 220. The second seals 220 are preferably O-rings. Such an embodiment is shown for example in FIG. 3 and FIG. 4. However, further designs known to a person skilled in the art are also conceivable in order to seal the one or more permeate tubes 180 towards the outside.

Process for Separating a Fluid Feed Stream into a Permeate Stream and a Retentate Stream To separate the fluid feed stream 20 into a permeate stream 30 and a retentate stream 40, the fluid feed stream 20 is first guided through the one or more fluid inlet openings 90 into the membrane module 10. From there, the fluid feed stream 20 flows in the direction of the one or more retentate outlet openings 100 through the membrane module 10.

During the throughflow through the membrane module 10, the permeate material (e.g. carbon dioxide) contained in the fluid feed stream 20 flows through the membranes 150 into the inside of the membrane pockets 130. In contrast, the membranes 150 are less permeable to other constituents of the fluid feed stream 20. In this way, the fluid feed stream 20 is substantially separated into a permeate stream 30 and a retentate stream 40. The permeate stream 30 is present in the membrane pockets 130, the retentate stream 40 is present between the membrane pockets 130.

The permeate stream 30 furthermore flows out of the membrane pockets 130 through the openings 190 into the one or more permeate tubes 180.

The first seals 200 fitted on the one or more permeate tubes 180 between the membrane pockets 130 prevent the fluid feed stream 20 and/or the retentate stream 40 from flowing into the one or more permeate tubes 180. This is illustrated for example in FIG. 3. The retentate stream 40 flowing between the membrane pockets 130 therefore flows around the one or more permeate tubes 180 in the direction of the retentate outlet openings 100. This is illustrated for example in FIG. 6 and FIG. 7.

According to a preferred embodiment, a lower pressure is applied at the one or more permeate outlet openings 110 than at the one or more fluid inlet openings 90 and the one or more retentate outlet openings 100. This can be achieved for example by means of vacuum pumps.

As the membrane pockets 130 are in flow connection with the one or more retentate outlet openings 100 via the one or more permeate tubes 180 and the one or more openings 190, there is a lower pressure in the membrane pockets 130 than between the membrane pockets 120, where the fluid feed stream 20 and the retentate stream 40 flow. This has the result that the permeate material is drawn out of the fluid feed stream 20 through the membranes 150 into the inside of the membrane pockets 130. From there, the permeate stream 30 is drawn, via the one or more openings 190, into the one or more permeate tubes 180 and finally to the permeate outlet openings 110, where the permeate stream 30 is discharged from the membrane module 10.

In this way, the separating capacity of the membrane module 10 can be increased. When a negative pressure is applied, the second spacers 170 present in the membrane pockets 130 also guarantee a free flow cross-section in the membrane pockets 130 for the throughflow of the permeate stream 30, by preventing the membranes 150 of the membrane pockets 130 from being drawn together because of the negative pressure in the membrane pockets 130.

When a membrane module 10 shown in FIG. 2 and FIG. 6, which has a permeate tube 180 and in each case one permeate outlet opening 110 in the roof 80 and in the floor 60 on the upstream side of the membrane module 10, is used, the fluid feed stream 20 and the permeate stream 30 at least partially flow past each other in accordance with the countercurrent principle. This is illustrated in FIG. 6. According to another embodiment, the membrane module 10 comprises several permeate tubes 180 and permeate outlet openings 110 on the upstream side of the membrane module 10. Also according to such an embodiment, the fluid feed stream 20 and the permeate stream 30 at least partially flow past each other in accordance with the countercurrent principle. In this way, the efficiency of the membrane module 10 is improved compared with membrane modules based on the co-current and cross-current principle.

Use of the Membrane Module According to the Invention

The membrane module according to the invention is preferably used to separate gases from a fluid feed stream 20. Neither the gas nor the fluid feed stream 20 is limited to particular compounds or substances.

The gas removed from the fluid feed stream 20 is preferably carbon dioxide. The membrane module according to the invention is particularly preferably used to remove carbon dioxide from the flue gas of a power station. Using a 20' container, only a total of 90 membrane modules would be necessary to separate carbon dioxide from the flue gas of a hard-coal-fired power station with a capacity of 1500 MW, instead of the currently required 6,000 membrane modules. If a larger container were used, fewer membrane modules would accordingly be necessary.

The invention claimed is:

1. Membrane module for separating a fluid feed stream which comprises permeate material and retentate material into a permeate stream and a retentate stream, comprising:
   a. a substantially box-shaped 20', 40', 45' HC, 45' PW or 53' HC container, with an internal space, the internal space is defined by a floor, two to four side walls and a roof, wherein the internal space has a width, height and length;
   b. one or more fluid inlet openings in at least one of the two to four side walls;
   c. one or more retentate outlet openings in at least one other of the two to four side walls, which are in flow connection with the fluid inlet openings, for discharging the retentate stream;
   d. one or more permeate outlet openings in at least one of said floor, two to four side walls or roof for discharging the permeate stream;
   e. one or more membrane pocket stacks arranged inside the container, which comprise membrane pockets arranged in the form of a stack and, adjacent to the one or more fluid inlet openings and/or the one or more retentate outlet openings, first spacers between the membrane pockets, which keep the membrane pockets spaced apart, in order to make a free flow cross-section for the throughflow of the fluid feed stream and/or the retentate stream possible,
   wherein the membrane pockets each comprise two membranes each on one carrier material and one or more second spacers between the membranes, which keep the membranes spaced apart from each other, in order to make a free flow cross-section for the throughflow of the permeate stream through the membrane pockets possible, and
   wherein the membranes of a membrane pocket are connected to each other at the edges, in order to prevent the fluid feed stream and/or the retentate stream from penetrating into the membrane pockets;
   f. one or more permeate tubes, which lead, perpendicularly to the flow direction of the fluid feed stream, to the one or more permeate outlet openings,
   wherein the one or more permeate tubes comprise one or more radial openings, through which the permeate material from the membrane pockets arrives in the one or more permeate tubes, and wherein first seals are fitted on the one or more permeate tubes between the membrane pockets, which first seals prevent the fluid feed stream and/or the retentate stream from coming into contact with the one or more permeate tubes, and wherein the one or more membrane pocket stacks extend substantially along the entire length, width and height of the internal space of the container, except for the area or areas in which the permeate tube or tubes extend.

2. Membrane module according to claim 1, wherein the container is a 20' or 40' container.

3. Membrane module according to claim 1, wherein one side wall of said two to four side walls is formed entirely as the fluid inlet opening and/or another side wall of said two to four side walls is formed entirely as the retentate outlet opening.

4. Membrane module according to claim 1, wherein one side wall comprises 1 to 100 of the fluid inlet openings and another side wall of the two to four side walls comprises 1 to 100 of the retentate outlet openings.

5. Membrane module according to claim 1, wherein the one or more fluid inlet openings and the one or more retentate outlet openings are fitted in opposite side walls of the two to four side walls of the container.

6. Membrane module according claim 1, which comprises 1 to 100 of the permeate outlet openings.

7. Membrane module according to claim 1, wherein the one or more permeate outlet openings are formed as a flange.

8. Process for separating a fluid feed stream which comprises permeate material and retentate material into a permeate stream and a retentate stream, in which a. a membrane module according to claim 1 is provided;
b. a fluid feed stream is guided through one or more of the fluid inlet openings into the membrane module;
c. the fluid feed stream flows in the direction of the one or more retentate outlet openings, wherein, during the throughflow through the membrane module, the permeate material flows through the membranes into the membrane pockets, with the result that the fluid feed stream is separated into a permeate stream in the membrane pockets and a retentate stream between the membrane pockets;
d. the permeate stream flows from the membrane pockets through the one or more radial openings into the one or more permeate tubes, flows through the one or more permeate tubes to the one or more permeate outlet openings and is discharged there;
e. the retentate stream flows between the membrane pockets to the one or more retentate outlet openings and is discharged there.

9. Process according to claim 8, wherein a pressure is applied at the one or more permeate outlet openings which is lower than the pressure at the one or more fluid inlet openings and the one or more retentate outlet openings, with the result that the permeate stream is guided through the membrane pockets and the one or more radial openings into the one or more permeate tubes and is discharged at the one or more permeate outlet openings.

10. Process according to claim 8, in which the fluid feed stream and the permeate stream at least partially flow past each other in a countercurrent manner.

11. Membrane module according to claim 1, wherein the container is a 20' container.

12. Membrane module according to claim 2, wherein one side wall of the two to four side walls comprises 1 to 100 of the fluid inlet openings and another side wall of the two to four side walls comprises 1 to 100 of the retentate outlet openings.

13. Membrane module according to claim 1, wherein one side wall of the two to four side walls comprises 1 to 10 of the fluid inlet openings and another side wall of the two to four side walls comprises 1 to 10 of the retentate outlet openings.

14. Membrane module according to one of claim 2, wherein one side wall of the two to four side walls comprises 1 to 10 of the fluid inlet openings and another side wall of the two to four side walls comprises 1 to 10 of the retentate outlet openings.

15. Membrane module according claim 1, which comprises 1 to 10 of the permeate outlet openings.

16. Membrane module according claim 1, which comprises 1 to 8 of the permeate outlet openings.

17. Process according to claim 9, in which the fluid feed stream and the permeate stream at least partially flow past each other in a countercurrent manner.

\* \* \* \* \*